United States Patent
Huang et al.

(10) Patent No.: US 10,034,293 B2
(45) Date of Patent: Jul. 24, 2018

(54) D2D DISCOVERY AND COMMUNICATION METHOD, RESOURCE ALLOCATION METHOD, AND CONTROL NODE

(71) Applicant: ZTE CORPORATION, Shenzhen (CN)

(72) Inventors: Ying Huang, Shenzhen (CN); Lin Chen, Shenzhen (CN); Feng Xie, Shenzhen (CN)

(73) Assignee: XI'AN ZHONGXING NEW SOFTWARE CO., LTD., Xi'An, Shaanxi (CN)

( * ) Notice: Subject to any disclaimer, the term of this patent is extended or adjusted under 35 U.S.C. 154(b) by 32 days.

(21) Appl. No.: 15/114,407

(22) PCT Filed: Aug. 11, 2014

(86) PCT No.: PCT/CN2014/084114
§ 371 (c)(1),
(2) Date: Jul. 27, 2016

(87) PCT Pub. No.: WO2015/113393
PCT Pub. Date: Aug. 6, 2015

(65) Prior Publication Data
US 2016/0345307 A1 Nov. 24, 2016

(30) Foreign Application Priority Data
Jan. 28, 2014 (CN) .......................... 2014 1 0042304

(51) Int. Cl.
*H04W 72/04* (2009.01)
*H04W 8/00* (2009.01)
(Continued)

(52) U.S. Cl.
CPC ......... *H04W 72/048* (2013.01); *H04W 8/005* (2013.01); *H04W 48/10* (2013.01);
(Continued)

(58) Field of Classification Search
None
See application file for complete search history.

(56) References Cited

U.S. PATENT DOCUMENTS 9,736,817 B2 * 8/2017 Fodor .................. H04W 72/04
9,788,186 B2 * 10/2017 Chatterjee ............. H04W 48/16
(Continued)

FOREIGN PATENT DOCUMENTS

| CN | 102246575 A | 11/2011 |
|---|---|---|
| CN | 102547871 A | 7/2012 |

(Continued)

OTHER PUBLICATIONS

R2-134149; 3GPP TSG-RAN WG2 #84; San Francisco, USA, Nov. 11-15, 2013.

*Primary Examiner* — Eunsook Choi
(74) *Attorney, Agent, or Firm* — Ling Wu; Stephen Yang; Ling and Yang Intellectual Property

(57) ABSTRACT

Provided in embodiments of the present document are a D2D discovery and communication method, a resource allocation method and a control node, wherein the resource allocation method includes: a control node obtaining D2D resource set information, wherein the D2D resource set includes a D2D discovery resource set and/or a D2D communication resource set; the control node or a D2D user equipment determining D2D discovery or communication scheduling resources of the D2D user equipment according to the D2D resource set information.

29 Claims, 7 Drawing Sheets

(51) Int. Cl.
*H04W 52/02* (2009.01)
*H04W 48/10* (2009.01)
*H04W 72/12* (2009.01)
*H04W 92/18* (2009.01)

(52) U.S. Cl.
CPC ... *H04W 52/0216* (2013.01); *H04W 52/0219* (2013.01); *H04W 72/04* (2013.01); *H04W 72/12* (2013.01); *H04W 92/18* (2013.01); *Y02D 70/00* (2018.01); *Y02D 70/21* (2018.01)

(56) References Cited

U.S. PATENT DOCUMENTS

| | | | |
|---|---|---|---|
| 2013/0109301 A1* | 5/2013 | Hakola | H04W 76/023 455/39 |
| 2013/0308551 A1* | 11/2013 | Madan | H04W 72/0406 370/329 |
| 2014/0315562 A1 | 10/2014 | Lim et al. | |

FOREIGN PATENT DOCUMENTS

| | | |
|---|---|---|
| CN | 103298141 A | 9/2013 |
| CN | 103313406 A | 9/2013 |
| WO | WO2012091420 A2 | 7/2012 |
| WO | 2013062351 A1 | 5/2013 |
| WO | 2013120267 A1 | 8/2013 |
| WO | 2013177179 A1 | 11/2013 |

* cited by examiner

D2D DISCOVERY AND COMMUNICATION METHOD, RESOURCE ALLOCATION METHOD, AND CONTROL NODE

TECHNICAL FIELD

The present document relates to the field of mobile communications, and more particularly, to a Device-to-Device (D2D) discovery and communications method, a resource allocation method and a control node.

BACKGROUND OF THE RELATED ART

With the development of wireless multimedia services, demands for high data rates and user experience are increasing, thus putting forward higher requirements for the system capacity and coverage of traditional cellular networks. The popularity of applications such as social networking, short-distance data sharing and local advertising, on the other hand, increases people's requirements for understanding nearby people or things of interest and communicating with them (Proximity Services). Traditional cell-based cellular network has obvious limitations in supporting high data rates and proximity services, in the context of this demand, the Device-to-Device (D2D) technology, a representative of the new direction of future communication technology development, was introduced. The application of the D2D technology can reduce the burden on the cellular network, reduce battery power consumption of the user equipment, increase the data rate, and improve the robustness of the network infrastructure, which can well meet the requirements of high data rate services and proximity services.

The D2D technology can work on the authorized or unauthorized frequency bands, and allow a plurality of user equipments that support the D2D function (that is, D2D user equipment, D2D UE) performing direct discover/direct communication in the existing network infrastructure or in the case of having no network infrastructure. There are three main D2D application scenarios:

1) the UE1 and the UE2 exchange data under the coverage of cellular networks, and user plane data do not pass through the network infrastructure, as mode 1 shown in FIG. 1;

2) UE relay transmission in a weak/non coverage area, as mode 2 shown in FIG. 1, it allows the UE4 with poor signal quality communicating with the network through the nearby UE3 which has network coverage, so as to help the operator expand coverage and increase capacity;

3) In the event of an earthquake or an emergency and the cellular network cannot work properly, the devices are allowed to communicate directly, as mode 3 in FIG. 1, the control plane and the user plane between the UE5, the UE6 and the UE7 perform one hop or multi-hop data communication without passing through the network infrastructure.

The D2D technology usually comprises the D2D discovery technology and the D2D communication technology:

1) the D2D discovery technology is a technology used to judge/determine that a plurality of D2D user equipments are neighboring with each other (e.g. within the scope of the D2D direct communication) or judge/determine that a first user equipment is neighboring with a second user equipment.

2) the D2D communication technology is a technology in which some or all of the communication data between the D2D user equipments may be directly used for communication without passing through the network infrastructure.

In a scenario of having the cellular network coverage, the D2D discovery or communication resources are usually scheduled and allocated by the base station, which can improve the resource reuse efficiency, and also ensure the control of the network side on the D2D discovery or communication as well as the effect of coordination between the D2D and the cellular system. The discovery or communication resources of the D2D UE can be dynamically scheduled by the base station, or the base station can allocate semi-persistent scheduling resources to the D2D UE. In public security scenarios, the D2D communication requires high robustness, and can still provide services to the maximum extent in the case that the current communication resources are insufficient or congest or the network infrastructure is paralyzing. Therefore, the public security requires the D2D communication works not only in scenarios of having network coverage, but also in scenarios of having some as well as no network coverage. In scenarios of having no network coverage, the D2D user equipment can work in the self-organized manner, or some D2D user equipments can be selected in the scenario of having no network coverage as control nodes to perform the D2D communication management and control, these control nodes provide functionality similar to the base station, such as synchronization and resource management.

A plurality of D2D UEs performing the D2D discovery or communication may be served by different base station (or Control Node), for example, the neighboring UEs performing the D2D communication are respectively located at the coverage edges of different base station, while in the related art, there is no D2D communication resource allocation method for this scenario. Typically, the D2D UEs in the network coverage take the synchronization information sent by the base stations as the D2D synchronization reference, but in a scenario in which the UEs performing the D2D discovery or communication are respectively served by different base stations, different base stations cannot guarantee that they are in the synchronized state (especially for the FDD base station), if the UEs performing the D2D discovery or communication in the scenarios of having no network coverage are respectively served by different control nodes, the different control nodes may not interact in order to be synchronized. In such a scenario, how the UEs performing the D2D discovery or communication are synchronized has no solutions yet.

SUMMARY

The embodiment of the present document provides a Device-to-Device (D2D) discovery and communication method, a resource allocation method and a control node to solve the problem of resource interaction and negotiation and synchronization among UEs in a scenario in which a plurality of D2D UEs performing the D2D discovery or communication are served by different control nodes.

A Device-to-Device (D2D) discovery and communication resource allocation method comprises:

a control node obtaining D2D resource set information, wherein a D2D resource set comprises a D2D discovery resource set and/or a D2D communication resource set;

the control node determining D2D discovery or communication scheduling resources of D2D user equipments according to the D2D resource set information.

Preferably, the control node comprises: a base station, or a D2D user equipment acting as a D2D control identity.

Preferably, the control node obtaining the D2D resource set information comprises:

the control node obtaining the D2D resource set information from an operation, administration and maintenance (OAM) system;

or, the control node itself configuring the D2D resource set information;

or, the control node obtaining the D2D resource set information from a core network element or a newly added D2D control network element.

Preferably, the control node itself configuring the D2D resource set information comprises:

the control node configuring its own D2D resource set information according to D2D resource information used by a neighboring control node.

Preferably, the control node configuring its own D2D resource set information according to D2D resource information used by a neighboring control node comprises:

the control node obtaining the D2D resource information used by the neighboring control node through an S1 interface or an X2 interface or an air interface.

Preferably, after the step of the control node itself configuring the D2D resource set information, the method further comprises:

the control node sending the D2D resource set information to other control node or the core network element or the newly added D2D control network element.

Preferably, after the step of the control node sending the D2D resource set information to other control node or the core network element or the newly added D2D control network element, the method further comprises:

the control node receiving recommended or available or unavailable D2D resource information sent by the other control node or the core network element or the newly added D2D control network element;

the control node adjusting and determining its own D2D resource set information according to the recommended or available or unavailable D2D resource information.

Preferably, the D2D resource set information comprises resource set information used for the D2D discovery or communication, and the resource set information comprises at least one of the following:

a list of resources identified by carrier frequency and bandwidth information;

a subframe pattern, resource block (RB) information, a resource usage constraint condition.

Preferably, the resource usage constraint condition comprise that:

a downlink cellular resource usage constraint condition is that downlink cellular resources can be only used in a non-cellular network coverage area;

or, D2D dedicated resources can be applied to a network coverage area and a non-network coverage area.

Preferably the resource set information used for the D2D discovery or communication comprises at least one of the following:

first D2D discovery or communication resource set information that can be used when all user equipments performing the D2D discovery or communication are served by the control node, second D2D discovery or communication resource set information that can be used when user equipments performing the D2D discovery or communication are served by the control node and the neighboring control node.

Preferably, the method further comprises:

the control node sending the D2D resource set information to the neighboring control node.

Preferably, after the step of the control node obtaining the D2D resource set information, the method further comprises:

the control node sending the D2D resource set information to the neighboring control node via the S1 interface or the X2 interface;

or, the control node sending the D2D resource set information to the core network element or the newly added D2D control network element.

Preferably, after the step of the control node sending the D2D resource set information to the core network element or the newly added D2D control network element, the method further comprises:

after the D2D resource set information changes, sending changed D2D resource set information to the neighboring control node or the core network element or the newly added D2D control network element.

Preferably, the method further comprises:

the control node sending the D2D resource set information by broadcast through an air interface.

Preferably, the control node sending the D2D resource set information by broadcast through an air interface comprises:

the control node sending the D2D resource set information of the neighboring control node by broadcast through the air interface; or, the control node broadcasting sending the D2D resource set information that can be used under non-cellular network coverage by broadcast through the air interface.

Preferably, before the step of the control node determining the D2D discovery or communication scheduling resources of the D2D user equipment according to the D2D resource set information, the method further comprises:

the control node receiving D2D discovery or communication resource request information of the D2D user equipment, wherein the D2D discovery or communication resource request information is contained in a cache status report, or a scheduling request or other media access control (MAC) control unit or radio resource control (RRC) messages.

Preferably, the step of the control node determining the D2D discovery or communication scheduling resources of the D2D user equipment according to the D2D resource set information comprises:

the control node selecting the D2D discovery or communication scheduling resources of the D2D user equipment from the D2D resource set information.

Preferably, the control node selecting the D2D discovery or communication scheduling resources of the D2D user equipment from the D2D resource set information comprises:

the control node judging whether all the D2D user equipments in the D2D discovery or communication of the D2D user equipment are served by the control node;

the control node selecting the D2D discovery or communication scheduling resources of the D2D user equipment from the D2D resource set information according to a judgment result.

Preferably, the D2D resource set comprises a first D2D resource set and a second D2D resource set, and the control node selecting the D2D discovery or communication scheduling resources of the D2D user equipment from the D2D resource set information according to a judgment result comprises:

if the judgment result is yes, the control node selecting the D2D discovery or communication scheduling resources of the D2D user equipment from the first D2D resource set;

if the judgment result is no, the control node selecting the D2D discovery or communication scheduling resources of the D2D user equipment from the second D2D resource set.

Preferably, after the step of the control node determining the D2D discovery or communication scheduling resources of the D2D user equipment according to the D2D resource set information, the method further comprises:

the control node sending the D2D discovery or communication resource scheduling information of the D2D user equipment to relevant neighboring control node, wherein the relevant neighboring control node at least comprise one of the following:

a neighboring control node to which a target D2D user equipment in the D2D discovery or communication of the D2D user equipment accesses, a neighboring control node to which a D2D user equipment in a D2D group in the D2D discovery or communication of the D2D user equipment accesses, a neighboring control node of the control node.

Preferably, the D2D discovery or communication resource scheduling information comprises: D2D resource allocation information and/or D2D resource configuration information.

Preferably, the D2D resource allocation information comprises D2D semi-persistent scheduling configuration information, wherein the D2D semi-persistent scheduling configuration information comprises at least one of the following:

a D2D semi-persistent scheduling air interface network temporary identifier, a D2D semi-persistent scheduling establishment/release indication, and a semi-persistent scheduling period.

Preferably, the D2D resource configuration information further comprises:

a D2D broadcast/multicast/unicast communication identifier, or, a D2D multicast communication group identifier, or, a user equipment identifier of a D2D discovery or communication sender.

Preferably, the D2D resource allocation information at least comprises one of the following:

D2D time-frequency resource information, transmission attribute information, the transmission attribute information comprises modulation and coding scheme (MCS) information.

Preferably, the D2D discovery or communication resource scheduling information further comprises indication information indicating resources used for sending or receiving data.

Preferably, the method further comprises:

if the D2D discovery or communication resource scheduling information does not comprise indication information of sending or receiving resources, or the user equipment identifier of the D2D discovery or communication sender, a D2D user equipment that receives the D2D discovery or communication resource scheduling information determining the D2D sending and/or receiving resource.

Preferably, after the step of the control node sending the D2D discovery or communication resource scheduling information of the D2D user equipment to the relevant neighboring control node, the method further comprises:

after the relevant neighboring control node judges whether the D2D discovery or communication scheduling resources of the D2D user equipment are available, receiving a response message sent by the relevant neighboring control node.

Preferably, if the D2D discovery or communication scheduling resources are available, the response message is an acknowledgement message; and/or, if the D2D discovery or communication scheduling resources are not available, the response message is available or recommended D2D discovery or communication resource scheduling information.

Preferably, after the step of the relevant neighboring control node sending a response message to the control node, the method further comprises:

the control node determining whether to change the D2D discovery or communication resource scheduling information of the D2D user equipment according to the received response message.

Preferably, the control node determining whether to change the D2D discovery or communication resource scheduling information of the D2D user equipment according to the received response message comprises:

if the response message is the acknowledgment message, the control node not needing to change the D2D discovery or communication resource scheduling information of the D2D user equipment, and the control node sending the D2D discovery or communication resource scheduling information of the D2D user equipment to the D2D user equipment;

if the response message is not the acknowledgment message, the control node needing to change the D2D discovery or communication resource scheduling information of the D2D user equipment, and the control node sending changed D2D discovery or communication resource scheduling information to the D2D user equipment and/or the relevant neighboring control node.

Preferably, the method further comprises:

after the control node determines the D2D communication scheduling resources of the D2D user equipment according to the D2D resource set information, or after the relevant neighboring control node or the D2D user equipment has received the D2D discovery or communication resource scheduling information, the control node or the relevant neighboring control node or the D2D user equipment sending D2D discovery or communication resource scheduling notification information via the air interface by means of broadcast or unicast, wherein the D2D discovery or communication scheduling resource notification information comprises the D2D discovery or communication resource scheduling information.

Preferably, the D2D discovery or communication scheduling resource notification information comprises timing auxiliary information, wherein the timing auxiliary information comprises:

time-domain and/or frequency-domain offset information, or, identification information of a control node to which the user equipment of the D2D communication sender accesses;

the identification information of the control node comprises: identification information of a serving cell, or identification information of a serving base station, or identification information of the control node.

Preferably, the D2D discovery or communication scheduling resource notification information comprises instruction information indicating resources used for sending or receiving data.

A Device-to-Device (D2D) discovery and communication method comprises:

a D2D user equipment obtaining D2D resource set information, wherein the D2D resource set comprises a D2D discovery resource set and/or a D2D communication resource set;

the D2D user equipment determining D2D discovery or communication scheduling resources of the D2D user equipment according to the D2D resource set information;

the D2D user equipment using the D2D communication scheduling resources to perform D2D discovery or D2D communication.

Preferably, the D2D device obtaining the D2D resource set information from a broadcast message of a control node.

Preferably, the step of the D2D user equipment determining D2D discovery or communication scheduling resources of the D2D user equipment according to the D2D resource set information comprises:

the D2D user equipment selecting the D2D discovery or communication scheduling resources of D2D user equipment from the D2D resource set information.

Preferably, the D2D user equipment selecting the D2D discovery or communication scheduling resources of the D2D user equipment from the D2D resource set information comprises:

the D2D user equipment judging whether all D2D user equipments in the D2D discovery or communication of the D2D user equipment are served by the control node;

the D2D user equipment selecting D2D discovery or communication scheduling resources of the D2D user equipment from the D2D resource set information according to a judgment result.

Preferably, the D2D resource set comprises a first D2D resource set and a second D2D resource set, and the control node selecting the D2D discovery or communication scheduling resources of the D2D user equipment from the D2D resource set information according to a judgment result comprises:

if the judgment result is yes, the D2D user equipment selecting the D2D discovery or communication scheduling resources of the D2D user equipment from the first D2D resource set;

if the judgment result is no, the D2D user equipment selecting the D2D discovery or communication scheduling resources of the D2D user equipment from the second D2D resource set.

Preferably, the method further comprises:

after determining the D2D discovery or communication scheduling resources, the D2D user equipment sending resource notification information by broadcast or unicast through an air interface.

A control node comprises a resource obtaining unit and a resource allocating unit, wherein, the resource obtaining unit is configured to: obtain D2D resource set information, wherein the D2D resource set comprises a D2D discovery resource set and/or a D2D communication resource set;

the resource allocating unit is configured to: determine the D2D discovery or communication scheduling resource of the D2D user equipment according to the D2D resource set information.

Preferably, the control node further comprises:

a sending unit, configured to: send the D2D resource set information to other control node or a core network element or a newly added D2D control network element.

Preferably, the control node further comprises:

a receiving unit, configured to: receive recommended or available or unavailable D2D resource information sent by the other control node and/or the core network element and/or the newly added D2D control network element;

the obtaining unit, further configured to adjust and determine its own D2D resource set information according to the recommended or available or unavailable D2D resource information.

Preferably, the control node further comprises: a sending unit, configured to send the D2D resource set information to a neighboring control node.

Preferably, the control node further comprises: a sending unit, configured to send the D2D resource set information by broadcast through the air interface.

Preferably, the control node further comprises:

a sending unit, configured to send the D2D discovery or communication resource scheduling information of the D2D user equipment to the relevant neighboring control node, wherein the relevant neighboring control node at least comprise one of the following:

a neighboring control node to which a target D2D user equipment in D2D discovery or communication of the D2D user equipment accesses, a neighboring control node to which a D2D user equipment in a D2D group of D2D discovery or communication of the D2D user equipment accesses, a neighboring control node of the control node.

Preferably, the control node further comprises: a receiving unit, configured to: after judging whether the D2D discovery or communication scheduling resources of the D2D user equipment are available, receive a response message sent by the relevant neighboring control node.

Preferably, the resource obtaining unit is further configured to determine whether to change the D2D discovery or communication resource scheduling information of the D2D user equipment according to the received response message.

Preferably, the sending unit is further configured to: after determining the D2D communication scheduling resources of the D2D user equipment according to the D2D resource set information, send the D2D discovery or communication resource scheduling notification information by broadcast or unicast through the air interface, wherein the D2D discovery or communication scheduling resource notification information comprises the D2D discovery or communication resource scheduling information.

The embodiment of the present document further provides a computer program comprising program commands, and when the program commands are executed by the control node, the control node can execute the abovementioned method.

The embodiment of the present document further provides a carrier carrying the abovementioned computer programs.

The embodiment of the present document can coordinate and interact the D2D discovery or communication resource information between different control nodes, and solves the problem of resource interaction and negotiation and the inter-UE synchronization in scenarios that a plurality of D2D UEs performing the D2D discovery or communication are served by different control nodes.

PREFERRED EMBODIMENTS

A plurality of D2D UEs performing the D2D discovery or communication may be served by different base stations (or Control Nodes), e.g., neighboring UEs performing the D2D communication are respectively located at the coverage edges of different base stations, while there is no D2D discovery or communication resource allocation method for this scenario in the prior art. Typically, the D2D UEs in the network coverage take synchronization information sent by the base stations as the D2D synchronization reference, but in a scenario that the UEs performing the D2D discovery or communication are respectively served by different base stations, different base stations cannot guarantee being in the synchronized state (especially for the FDD base station), if the UEs performing the D2D discovery or communication are served by different control nodes under no network coverage, different control nodes may not interact in order to be synchronized. There is still no solution on how the synchronization between the UEs perform the D2D discovery or communication is achieved under this scenario.

To solve the abovementioned problem, the embodiment of the present document provides a device-to-device discovery and communication method and system. Hereinafter, in conjunction with the accompanying drawings, embodiments of the present document will be described in detail. It should be noted that, in the case of no conflict, embodiments and features in the embodiments of the present application may be arbitrarily combined with each other.

The First Embodiment

Figure 1:
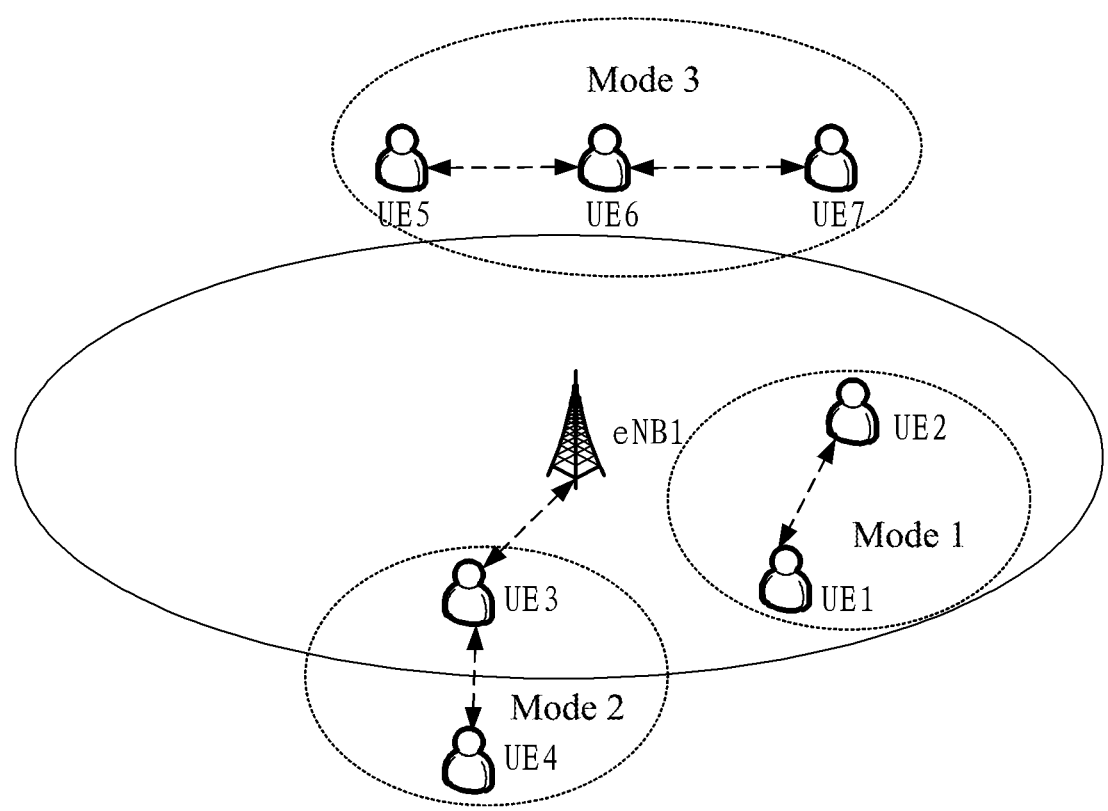
FIG. 1 is a schematic diagram of a D2D technology application mode.
Figure 2:
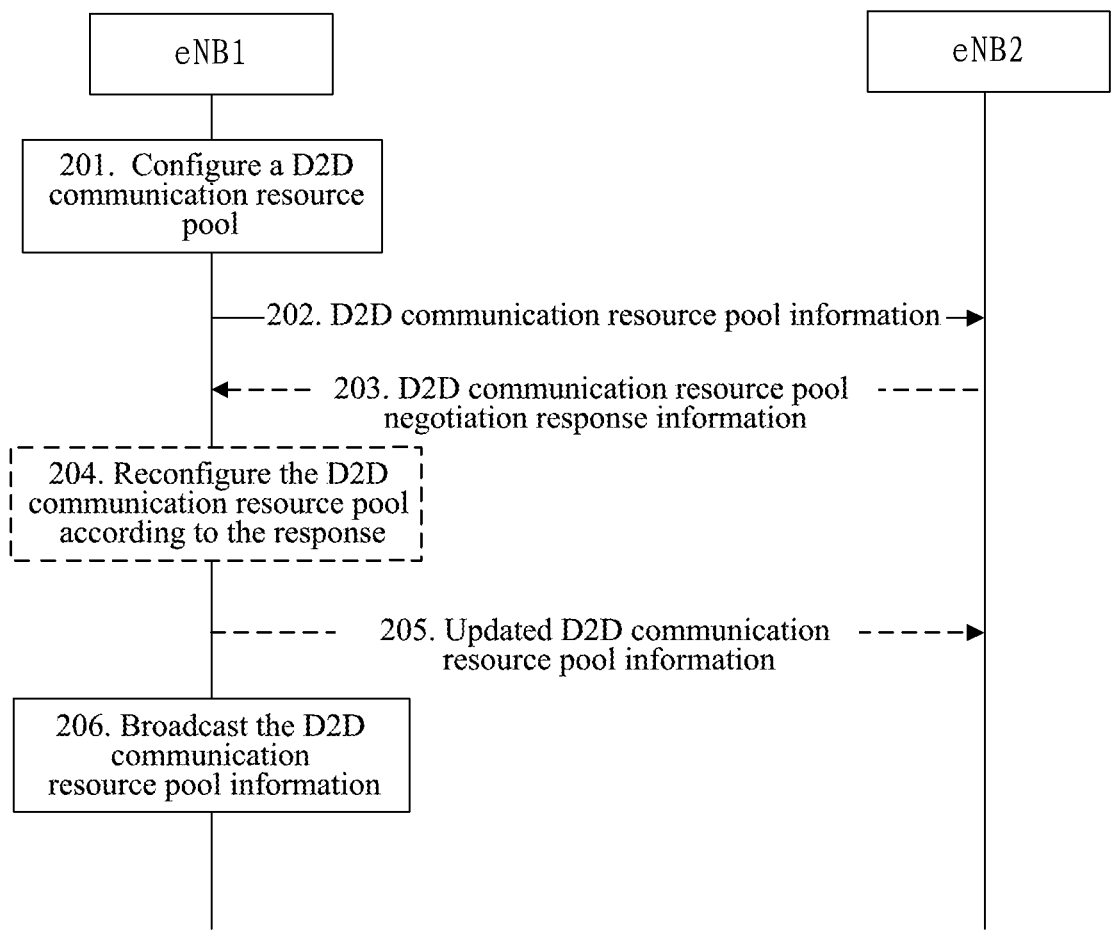
FIG. 2 is a schematic diagram of the process of a first embodiment of the present document.

The embodiment describes a method for directly interacting and negotiating D2D communication resources between the neighboring control nodes. It should be noted that, the method of the present embodiment is applicable not only to a D2D communication process, but also to a D2D discovery process. FIG. 2 is a flow chart of the present embodiment. FIG. 2 describes a scenario of having the network coverage, wherein the eNB1 and the eNB2 are neighboring base stations, when there is no network coverage, the base station function can be replaced by the control node, that is, the D2D UE acts as the central control entity (also known as central control element, CCE). Steps in the process of FIG. 2 are as follows.

In step 201, the eNB1 obtains the D2D communication resource pool information, wherein the D2D communication resource pool information is configured by the OAM system or by the eNB1 itself. Alternatively, before the eNB1 configures it, the eNB1 first monitors the D2D resource pool information of the neighboring base station through the air interface, or, the eNB1 obtains the D2D resource pool information of the neighboring base station through the X2 interface message interaction. The D2D communication resource pool is used for the D2D communication, wherein it may include a intra-cell/base station D2D communication available resource pool, and/or a inter-cell/base station D2D communication available resource pool. The inter-cell/base station D2D communication resource pool configured for the neighboring base station can be the same shared resource pool, or a different dedicated resource pool is configured for each base station. The dedicated resource pools of the neighboring base stations may overlap in both time domain and frequency domain, or overlap in the time domain but not in the frequency domain, or overlap in the frequency domain but not in the time domain.

In step 202, the eNB1 sends the configured D2D communication resource pool information via the X2 interface message to the neighboring base station (e.g., eNB2 shown in FIG. 2), wherein the X2 interface message includes: an X2 setup request message and a base station configuration update message, etc. The eNB1 also sends the configured D2D communication resource pool information to core network elements or newly added D2D control network elements via the S1 interfaces or a new interface. Wherein the S1 interface message includes: an S1 setup request message and a base station configuration update message, etc.

In step 203, optionally, the eNB2 may reply a D2D communication resource pool negotiation response message, if the eNB2 determines that the D2D communication resource pool information is available, then the eNB2 replies an acknowledgment message; or, if the eNB2 determines that the D2D communication resource pool information is not available (for example, some of the resources have been used by the eNB2), then the eNB2 replies the available or unavailable or recommended D2D communication resource pool information in the response message. The response message can be sent via an X2 interface message, such as, the X2 setup response message, base station configuration update acknowledgment/failure message.

In step 204, the eNB1 determines whether it needs to adjust the D2D communication resource pool configuration according to the response message of the neighboring base station, and if yes, the eNB1 reconfigures the D2D communication resource pool information according to the available or unavailable or recommended D2D communication resource pool information in the response message. In addition, the eNB1 may also adjust the D2D communication resource pool configuration according to the load status of the D2D UE served by it.

In step 205, if the D2D communication resource pool information of the eNB1 is updated, the eNB1 sends the updated D2D communication resource pool information to the neighboring base station.

In step 206, optionally, the eNB1 sends the D2D communication resource pool information by broadcast through the air interface. If the D2D communication uses the resource competition way, the D2D UE may select resources from the broadcasted and received D2D communication resource pool for the D2D data transmission. If the D2D communication uses the competition or non-competition resource way, the receiver D2D UE (especially the UE in the IDLE state) can receive the D2D data by monitoring the broadcasted and received D2D communication resource pool.

The Second Embodiment

Figure 3:
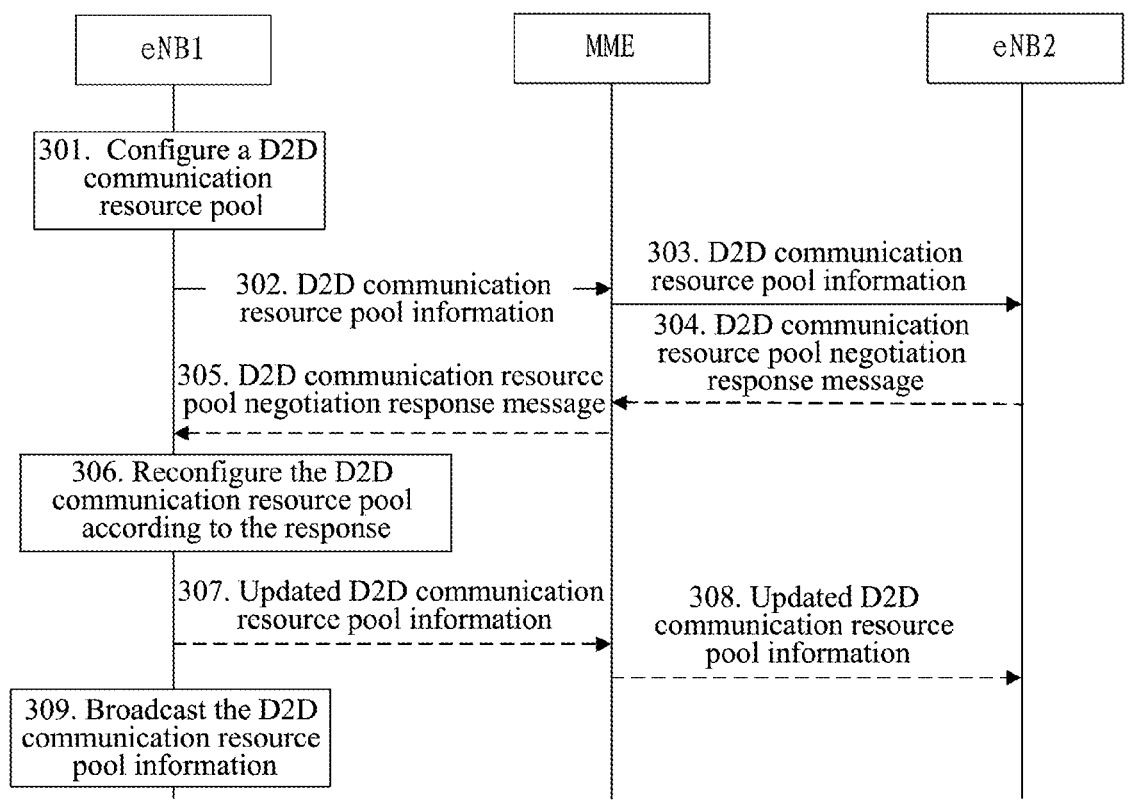
FIG. 3 is a schematic diagram of the process of a second embodiment of the present document.

The embodiment describes a method for interacting and negotiating D2D communication resources via the MME between the neighboring control nodes. It should be noted that, the method of the present embodiment is applicable not only to the D2D communication process, but also to the D2D discovery process. FIG. 3 is a flow chart of the present embodiment. FIG. 3 describes a scenario of having the network coverage, wherein the eNB1 and the eNB2 are neighboring base stations. Steps in the process of FIG. 3 are as follows.

In step 301, the eNB1 obtains the D2D communication resource pool information, wherein the D2D communication resource pool information is configured by the OAM system or by the eNB1 itself. Alternatively, before the eNB1 itself configures it, the eNB1 first monitors the D2D resource pool information of the neighboring eNB through the air interface, or, the eNB1 obtains the D2D resource pool information of the neighboring base station through the X2 interface message interaction. The D2D communication resource pool is used for the D2D communication, wherein it may include an intra-cell/base station D2D communication available resource pool, and/or an inter-cell/base station D2D communication available resource pool. The Inter-cell/base station D2D communication resource pool configured for the neighboring base station can be the same shared resource pool, or a different dedicated resource pool is configured for each base station. The dedicated resource pools of the neighboring base stations may overlap in both the time domain and the frequency domain, or overlap in the time domain but not in the frequency domain, or overlap in the frequency domain but not in the time domain.

In steps 302-303, for neighboring base station whose X2 interface is not available, the eNB1 sends the configured D2D communication resource pool information via a S1 interface message to the MME, and the MME sends it to the neighboring base station (eNB2 shown in FIG. 3), wherein the S1 interface message includes: a base station setup configuration transmission message and MME configuration transmission message. The eNB1 may also send the configured D2D communication resource pool information to the core network elements or the newly added D2D control network elements via the S1 interface or a new interface. Wherein the S1 interface message includes: an S1 setup request message and a base station configuration update message.

In steps 304-305, optionally, the eNB2 can reply a D2D communication resource pool negotiation response message, and if the eNB2 determines that the D2D communication resource pool information is available, it replies an acknowledgment message; or, if the eNB2 determines that the D2D communication resource pool information is not available (for example, some of the resources have been used by the eNB2), then it replies the available or unavailable or recommended D2D communication resource pool information in the response message. Because the X2 interface between the eNB1 and the eNB2 is not available, the eNB2 first sends the communication resource pool response message to the MME via an S1 interface message, and then the MME sends it to the eNB1, wherein the S1 interface message includes: a base station configuration transmission message and an MME configuration transmission message.

In step 306, the eNB1 determines whether it needs to adjust the D2D communication resource pool configuration according to the response message of the neighboring base station, and if yes, the eNB1 reconfigures the D2D communication resource pool information according to the available or unavailable or recommended D2D communication resource pool information in the response message. In addition, the eNB1 may also adjust the D2D communication resource pool configuration according to the load status of the D2D UE served by it.

In steps 307-308, if the D2D communication resource pool information of the eNB1 is updated, the eNB1 sends the updated D2D communication resource pool information to neighboring base station. Because the X2 interface between the eNB1 and the eNB2 is not available, the eNB1 sends the updated D2D communication resource pool information to the MME via an S1 interface message, and then the MME sends it to the eNB2, wherein the S1 interface message includes: a base station configuration transmission message and an MME configuration transmission message.

In step 309, optionally, the eNB1 sends the D2D communication resource pool information by broadcast through the air interface. If the D2D communication uses the resource competition way, the D2D UE may select resources from D2D communication resource pool received by the broadcast for sending the D2D data. If the D2D communication uses the resource competition or non-competition manner, the receiver D2D UE (especially the UE in the IDLE state) can receive the D2D data by monitoring the D2D communication resource pool received by the broadcast.

The Third Embodiment

Figure 4:
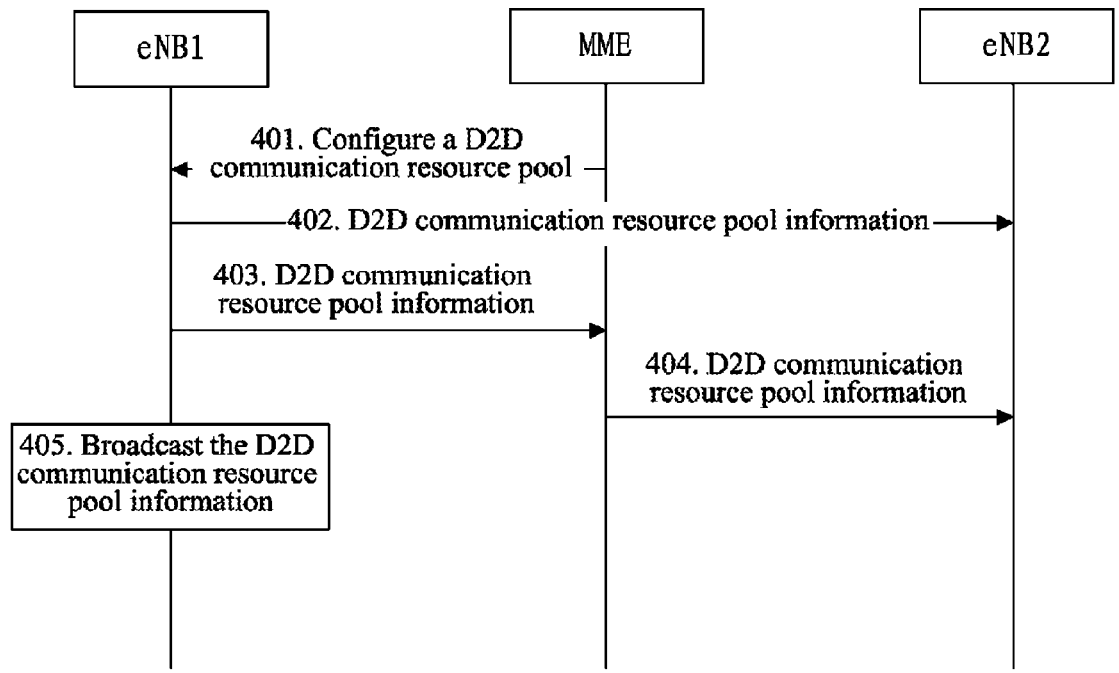
FIG. 4 is a schematic diagram of the process of a third embodiment of the present document.

The embodiment describes a method for directly interacting and negotiating D2D communication resources between the neighboring control nodes. It should be noted that, the method of the present embodiment is applicable not only to the D2D communication process, but also to the D2D discovery process. FIG. 4 is a flow chart of the present embodiment. FIG. 4 describes a scenario of having the network coverage, wherein the eNB1 and the eNB2 are neighboring base station. Steps in the process of FIG. 4 are as follows.

In step 401, the MME configures the eNB1 with the D2D communication resource pool information. The MME configures the eNB1 with the D2D communication resource pool information via the S1 interface message, such as the S1 setup response message and the MME configuration update message. In addition, the newly added D2D control network element may also configure the base station with the D2D communication resource pool information. The D2D communication resource pool is used for the D2D communication, wherein it may include an intra-cell/base station D2D communication available resource pool, and/or an inter-cell/base station D2D communication available resource pool. The inter-cell/base station D2D communication resource pool configured for the neighboring base station can be the same shared resource pool, or a different dedicated resource pool is configured for each base station. The dedicated resource pools of the neighboring base stations may overlap in both the time domain and the frequency domain, or overlap in the time domain but not in the frequency domain, or overlap in the frequency domain but not in the time domain.

In steps 402, the eNB1 sends the configured D2D communication resource pool information via the X2 interface message to the neighboring base station (e.g., eNB2 shown in FIG. 4), wherein the X2 interface message includes: an X2 setup request message and a base station configuration update message. The eNB1 may also send the configured D2D communication resource pool information to the core network element or the newly added D2D control network element via the S1 interface or a new interface. Wherein the S1 interface message includes: an S1 setup request message and a base station configuration update message.

In steps 403-404, for the neighboring base station whose X2 interface is not available, the eNB1 first sends the configured D2D communication resource pool information via the S1 interface message to the MME, and then the MME sends the information to the neighboring base station (eNB2 shown in FIG. 4), wherein the S1 interface message includes: an base station configuration transmission message and MME configuration transmission message.

In step 405, optionally, the eNB1 the D2D communication resource pool information by the broadcast through the air interface. If the D2D communication uses the resource competition way, the D2D UE may select resources from the D2D communication resource pool received by the broadcast for sending the D2D data. If the D2D communication uses the resource competition or non-competition manner, the receiver D2D UE (especially the UE in the IDLE state) can receive the D2D data by monitoring the D2D communication resource pool received by the broadcast.

The Fourth Embodiment

Figure 5:
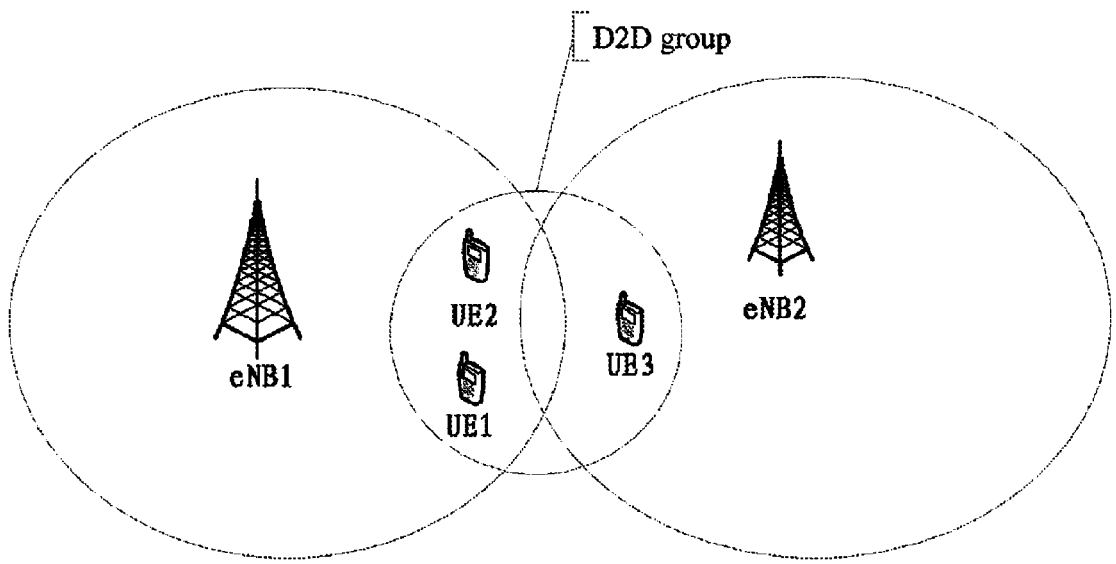
FIG. 5 is a schematic diagram of a scenario of the fourth, fifth and sixth embodiments of the present document.
Figure 6:
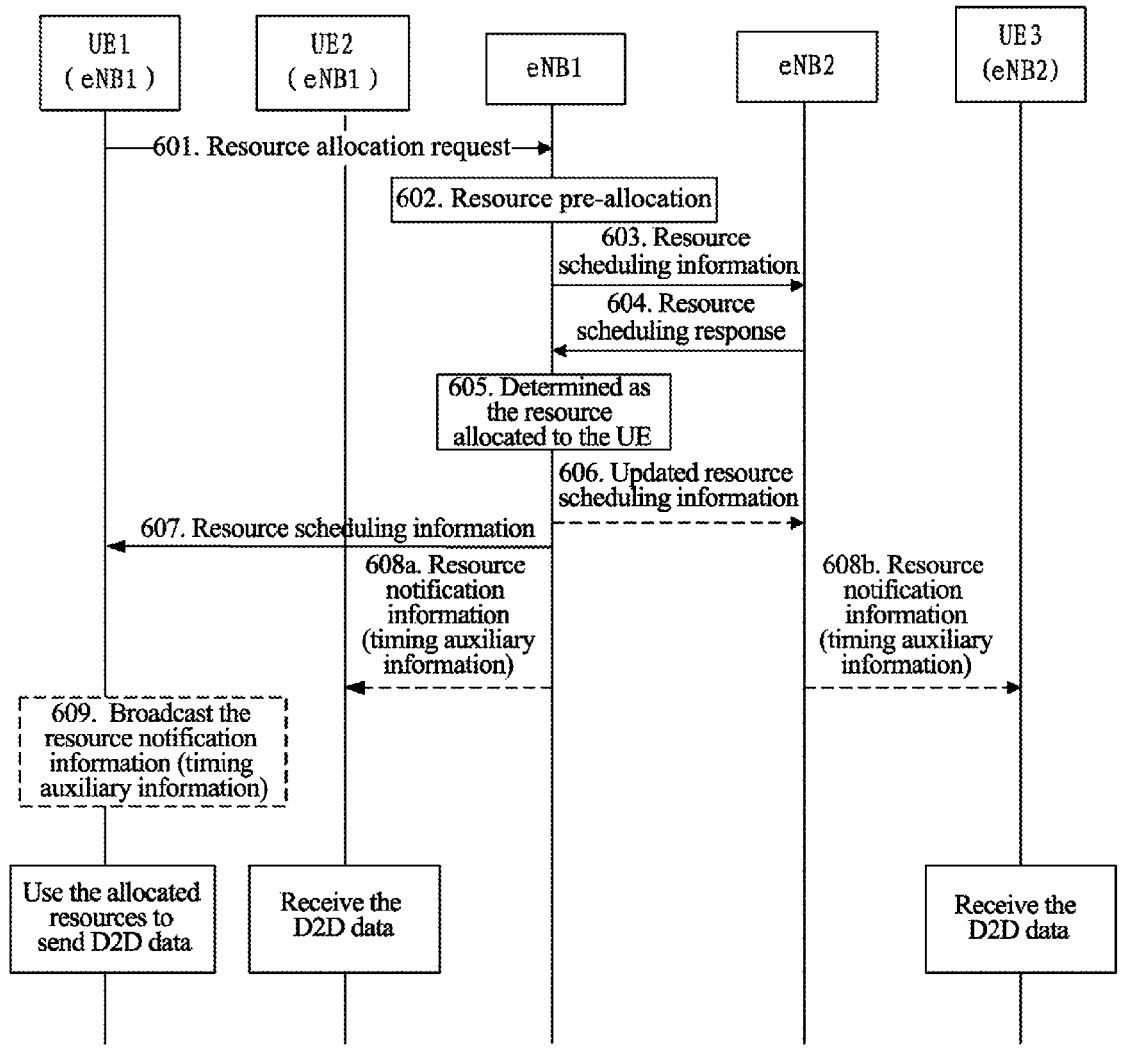
FIG. 6 is a schematic diagram of the process of a fourth embodiment of the present document.

The embodiment describes is a first method for D2D communication served by a plurality of base stations, FIG. 5 is a schematic diagram of a scenario of this embodiment method. As shown in FIG. 5, the eNB1 and the eNB2 and neighboring base stations, the UE1 and the UE2 are served by the eNB1 and are located at the cell edge, the UE3 is served by the eNB2 and is also located at the cell edge. The UE1, the UE2 and the UE3 are positioned nearby and belong to the same D2D group. It should be noted that, the method of the present embodiment is applicable not only to the D2D communication process, but also to the D2D discovery process. FIG. 6 is a flow chart of the present embodiment. FIG. 6 describes a scenario of having the network coverage, when there is no network coverage, the eNB function can be replaced by the control node, that is, the D2D UE acts as the central control entity (also known as central control element, CCE). Steps in the process of FIG. 6 are as follows.

In step 601, the UE1 has D2D communication data to send, and sends a resource allocation request to its serving base station eNB1. The resource allocation request can be sent via a scheduling request or a cache status report.

In step 602, the eNB1 pre-allocates resources to the UE1. Before the eNB1 pre-allocates resources to the UE1, the eNB1 has obtained the D2D communication resource pool information configuration, and the configuration method can refer to the method described in the first, second and third embodiments. Alternatively, before the eNB1 pre-allocates resources to the UE1, it pre-allocates the resources according to the D2D communication type requested by the UE1. Wherein the D2D communication type refers to whether the D2D communication is an inter-cell/base station D2D communication, for example, whether the UEs involved in the D2D communication are served by the same cell/base station or served by different cells/bas stations. If the base station judges that the D2D communication type is the intra-cell/base station D2D communication, the base station can select the D2D communication resource from the intra-cell/base station D2D communication resource pool for the UE1; if the base station judges that the D2D communication type is an cross-cell/base station D2D communication, it can select the D2D communication resource from the cross-cell/base station D2D communication resource pool for the UE1; in this embodiment, the resource pools configured for the cross-cell/base station D2D communication in the neighboring base stations are the same shared resource pool. While, under normal circumstances, the resource pools configured for the intra-cell/base station D2D communication in the neighboring base station are dedicated resource pools, so as to avoid interference in the inter-cell/base station D2D communication.

The base station can judge the D2D communication type in the following ways:

1) for the D2D group communication, the base station can maintain the D2D group identification list of the D2D UEs in the cell/base station, for example, when the D2D UE accesses to the base station, it reports the identification information of the D2D group in which it joins. The neighboring base station can exchange the identification information of their serving D2D groups via the X2 interface message. That is, the base station can maintain its own and neighboring cell/base station serving D2D group list information. When the UE has D2D data to send and sends a resource allocation request to the base station, the request can carry the group identifier of the requested D2D communication, and the base station can judge whether the D2D group communication requested by the UE is within the cell/base station or between the cells/base stations by retrieving the D2D group list information served by itself and the neighboring cells/base stations. The base station may also calculate its transmission range according to the geographic location in the cell and/or RF parameters of the UE requesting for the resource allocation and judges the D2D communication type requested by the UE by screening whether the neighboring base stations within the transmission range serve the D2D communication group.

2) For the D2D unicast communication, because the target UE in the communication has been determined, the base station can judge the D2D communication type through the way for obtaining the serving cell/base station identification information of the target UE. Specifically, the following way can be used to obtain the serving cell/base station identification information of the target UE: a. through the D2D discovery signal, for example, by explicitly carrying it in a discovery signal or implicitly indicating it with the discovery signal time-frequency resource; b. through the paging way initiated by the base station or the D2D UE; c. through the way of querying the D2D server.

In step 603, the eNB1 sends the resource information allocated to the UE1 (also known as the resource scheduling information) to the relevant neighboring base station. Specifically, for a D2D unicast communication, the relevant neighboring base station refers to the base station to which the target UE in the D2D communication requested by the UE1 accesses; for a D2D multicast communication, the relevant neighboring base station refer to base stations to which the D2D UEs in the D2D group of the D2D communication requested by the UE1 access. The eNB1 can also estimate its transmission range according to the geographical position and RF parameter of the UE1, and screens those base stations whose serving area and transmission range have overlaps as the relevant neighboring base stations. Specifically, the D2D communication resource scheduling information of the UE includes: a D2D resource allocation information and/or D2D resource configuration information. Wherein, the D2D resource allocation information includes D2D semi-persistent scheduling (SPS) configuration information. The D2D SPS configuration information may include: a D2DS SPS air interface radio network temporary identifier (RNTI), D2D SPS setup/release indication, and SPS period. In addition, the D2D resource configuration information may include: a D2D broadcast/multicast/unicast communication identifier, a D2D multicast communication group identifier, a D2D communication sender UE identifier (UE1 in this embodiment), and the like. The D2D resource allocation information includes: D2D communication time-frequency resources and transmission attribute information (e.g. modulation and coding scheme (MCS) information). The D2D communication resource scheduling information may further include indication information indicating whether the resource is used for sending data or receiving data. Alternatively, the identification information of the D2D communication sender UE may also be used to implicitly indicate whether the resource is used for sending data or receiving data. Alternatively, the D2D communication resource scheduling information does not include the resource sending or receiving indication information or the identifier of the D2D communication sender UE, and then the D2D UE that has received the D2D communication resource scheduling information determines the D2D sending and/or receiving resource.

In step 604, after the relevant neighboring base station receives the D2D communication resource scheduling information, it can judge whether the resource is available (for example, whether it has been occupied or not), and reply a resource scheduling response message. If it is available (unoccupied), the resource scheduling response message is an acknowledgement message; if it is not available (already occupied), the resource scheduling response message may include the available or recommended D2D communication resource scheduling information to the eNB1.

In step 605, the eNB1 judges whether to change the D2D communication resource scheduling information of the UE1 according to the resource scheduling response information of the neighboring base station. If the response message is an acknowledgement message, the eNB1 does not need to change the D2D communication resource scheduling information of the UE1; otherwise, the eNB1 needs to change the D2D communication resource scheduling information of the UE1.

In step 606, the eNB1 sends the D2D communication resource scheduling information (if there is update, it is the updated D2D communication resource scheduling information) to the relevant neighboring base station (eNB2 in FIG. 6), after receiving the information, the eNB2 considers that this block of resource has been occupied by the neighboring base station and is currently unavailable, and updates the available D2D communication resource set information maintained by it.

In step 607, the eNB1 sends the D2D communication resource scheduling information (if there is update, it is the updated D2D communication resource scheduling information) to the UE1; if the D2D communication resource scheduling information does not include the resource sending or receiving indication information or the identifier of the D2D communication sender UE, then the D2D user equipment that has received the D2D communication resource scheduling information determines the D2D sending and/or receiving resources.

In steps 608a-608b, the eNB1 and the relevant neighboring base station that has received the abovementioned D2D communication resource scheduling information send resource notification information via the air interface, and the D2D broadcast and multicast communication can be sent via the way of the broadcast, the D2D unicast communication can be sent to the target UE via the unicast. The resource notification information includes all or some of content in the D2D communication resource scheduling information. In an asynchronous network deployment (especially the FDD base station), i.e., the neighboring base station are not synchronized, because the D2D communication between the UEs takes the synchronization signal of the base stations as a reference under the network coverage, the resource notification information sent by the base station may also include the timing auxiliary information to achieve the synchronization between the D2D UE sender and receiver. If the neighboring base station knows the synchronization information with the eNB1, it can send the D2D communication resource scheduling information that has been calibrated in the time domain and/or frequency domain by the broadcast; or, the neighboring base station may carry the time or frequency offset information in the resource notification information; or the resource notification information may include the serving cell/base station information of the sender UE, and the receiver UE monitors the synchronization signal of the serving cell/base station of the sender UE to obtain the synchronization information (or the receiver UE can obtain the neighbor cell time or frequency offset list through its own serving cell in advance). Similarly, the resource notification information sent by the eNB1 may include the serving cell/base station information of the sender UE.

In Step 609, after receiving the resource scheduling information, the UE1 sends the resource notification information by the broadcast through the air interface, the information includes the timing auxiliary information (for the asynchronous network deployment), which may include the serving cell/base station information of the UE1, so that the D2D receiver UE synchronizes with the UE1 by taking the synchronization signal of the serving cell/base station of the UE1 as a reference.

Thereafter, the UE1 may use the allocated resources to send the D2D data, the UE2 and the UE3 can obtain the receiving resources by monitoring the D2D communication resource pool or the resource notification information and receive the D2D data sent by the UE1.

The Fifth Embodiment

Figure 7:
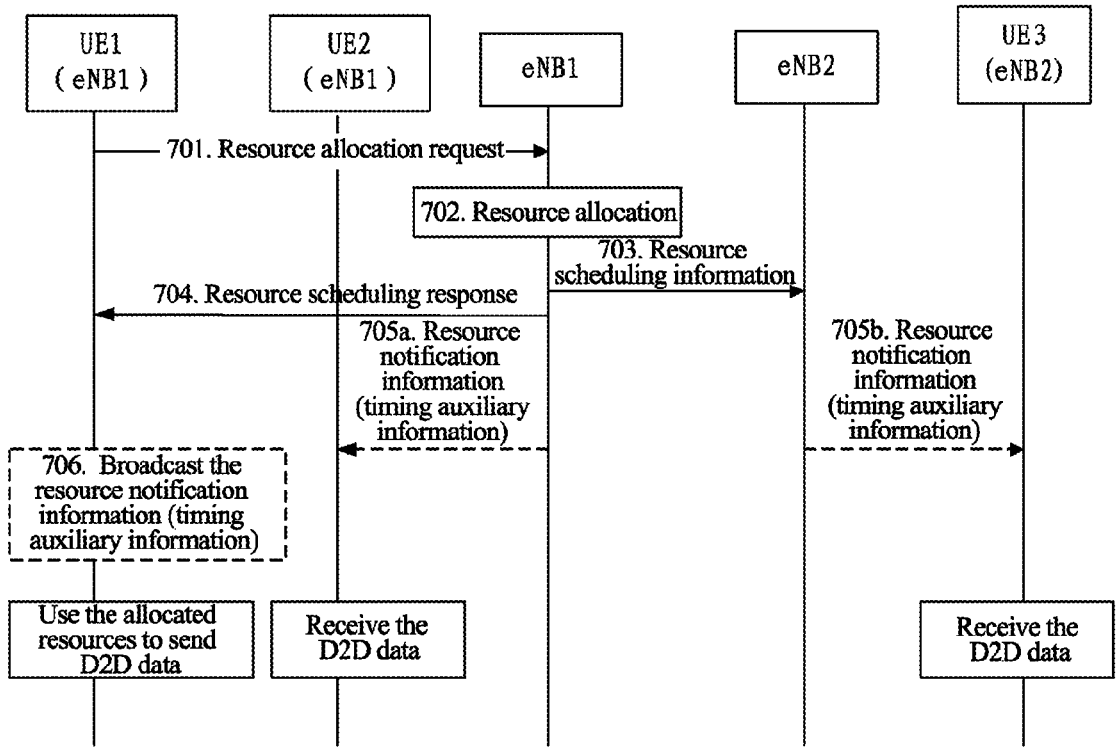
FIG. 7 is a schematic diagram of the process of a fifth embodiment of the present document.

The embodiment describes a second method for D2D communication served by a plurality of base stations. FIG. 5 is a schematic diagram of a scenario of this embodiment method. As shown in FIG. 5, the eNB1 and the eNB2 and neighboring base stations, the UE1 and the UE2 are served by the eNB1 and are located at the cell edge, the UE3 is served by the eNB2 and is also located at the cell edge. The UE1, the UE2 and the UE3 are positioned nearby and belong to the same D2D group. It should be noted that, the method of the present embodiment is applicable not only to the D2D communication process, but also to the D2D discovery process. FIG. 7 is a flow chart of the present embodiment. FIG. 7 describes a scenario of having the network coverage, when there is no network coverage, the eNB function can be replaced by the control node, that is, the D2D UE acts as the central control entity (also known as central control element, CCE). Steps in the process of FIG. 7 are as follows.

In step 701, the UE1 has D2D communication data to send, and sends a resource allocation request to its serving base station eNB1. The resource allocation request can be sent via a scheduling request or a cache status report.

In step 702, the eNB1 pre-allocates resources to the UE1. Before the eNB1 pre-allocates resources to the UE1, the eNB1 has obtained the D2D communication resource pool information configuration, and the configuration method can refer to the method described in the first, second and third embodiments. Alternatively, before the eNB1 pre-allocates resources to the UE1, it pre-allocates the resources based on the D2D communication type requested by the UE1. Wherein the D2D communication type refers to whether the D2D communication is an inter-cell/base station D2D communication, for example, whether the UEs participating in the D2D communication are served by the same cell/base station or different cells/base stations. If the base station judges that the D2D communication type is an intra-cell/base station D2D communication, the base station can select the D2D communication resources from the intra-cell/base station D2D communication resource pool for the UE1; if the base station judges that the D2D communication type is a cross-cell/base station D2D communication, it selects the D2D communication resources from the cross-cell/base station D2D communication resource pool for the UE1; in this embodiment, the resource pools configured for the inter-cell/base station D2D communication in the neighboring base stations are the same shared resource pool. Under normal circumstances, the resource pools configured for the intra-cell/base station D2D communication in the neighboring base stations are dedicated resource pools, so as to avoid interference in the inter-cell/base station D2D communication. The method for the base station judging the D2D communication type can refer to the description in the fourth embodiment.

In step 703, the eNB1 sends the resource information allocated to the UE1 (also known as the resource scheduling information) to the relevant neighboring base station. Specifically, for the D2D unicast communication, the relevant neighboring base station refers to the base station to which the target UE in the D2D communication requested by the UE1 accesses; for the D2D multicast communication, the relevant neighboring base stations refer to the base stations to which the D2D UEs in the D2D group of the D2D communication requested by the UE1 access. The eNB1 may also estimate its transmission range according to the geographical position and the RF parameter of the UE1, and those base stations whose serving areas and transmission ranges have overlaps are screened as the relevant neighboring base stations. Specifically, the D2D communication resource scheduling information of the UE includes: D2D resource allocation information and/or D2D resource configuration information. Wherein, the D2D resource allocation information includes the D2D semi-persistent scheduling (SPS) configuration information. The D2D SPS configuration information may include: D2DS SPS air interface radio network temporary identifier (RNTI), D2D SPS setup/release instruction, and SPS period. In addition, the D2D resource configuration information may include: the D2D broadcast/multicast/unicast communication identifier, D2D multicast communication group identifier, D2D communication sender UE identifier (UE1 in this embodiment), and the like. The D2D resource allocation information includes: the D2D communication time-frequency resource, and transmission attribute information (e.g. modulation and coding scheme (MCS) information). The D2D communication resource scheduling information may further include the indication information indicating whether the resource is used to send or receive data. Alternatively, the identification information of the D2D communication sender UE may also be used to implicitly indicate whether the resource is used for sending data or receiving data. Alternatively, the D2D communication resource scheduling information does not include the sending or receiving resource indication information or the identifier of the D2D communication sender UE, and then the D2D UE that has received the D2D communication resource scheduling information determines the D2D sending and/or receiving resource.

It should be noted that, in this embodiment, resource pools configured by neighboring base stations for inter-cell/base station D2D communication are different dedicated resource pools, if the time domain and the frequency domain of the inter-cell/base station D2D communication dedicated resource pools of the neighboring base stations do not overlap, or the time domain does not overlap, while the frequency domain does, the resources allocated by the eNB1 to the UE1 do not conflict with the neighboring base station or generate interference, the eNB1 does not need to negotiate the resource allocation of the UE1 with the neighboring base station, and only needs to inform the neighboring base station of its allocated resource information. However, if the time domain of the inter-cell/base station D2D communication dedicated resource pools of the neighboring base stations overlaps, but the frequency domain does not, although the resources allocated by the eNB1 to the UE1 do not conflict with the neighboring base station or generate interference, the D2D data cannot be sent and received simultaneously since the D2D UE only works in the half-duplex mode, in which case the eNB1 still needs to negotiate with the neighboring base station to perform the resource allocation of the UE1 to avoid the UE1 from simultaneously receiving and sending the D2D data (i.e., as described in steps 603-605 in the fourth embodiment).

In step 704, the eNB1 sends the D2D communication resource scheduling information to the UE1; if the D2D communication resource scheduling information does not include the sending or receiving resource indication information or the identification of the D2D communication sender UE, the D2D user equipment that has received the D2D communication resource scheduling information determines the D2D sending and/or receiving resources.

In step 705a-705b, the eNB1 and the relevant neighboring base station receiving the D2D communication resource scheduling information send the resource notification information via the air interface, and for the D2D broadcast and multicast communication, it can be sent via the broadcast, and for the D2D unicast communication, it can be sent to the target UE via the unicast. The resource notification information includes all or some of contents in the D2D communication resource scheduling information. In an asynchronous network deployment (especially the FDD base station), i.e., the neighboring base stations are not synchronized, because the D2D communication between the UEs takes the synchronization signal of the base station as a reference under the network coverage, the resource notification information sent by the base station may also include the timing auxiliary information to achieve the synchronization between the D2D UE sender and receiver. If the neighboring base station knows the synchronization information with the eNB1, it can send the D2D communication resource scheduling information that has been calibrated in the time domain and/or frequency domain by broadcast; or, the neighboring base station may carry the time or frequency offset information in the resource notification information; or the resource notification information may include the serving cell/base station information of the sender UE, and the receiver UE monitors the synchronization signal of the serving cell/base station of the sender UE to obtain the synchronization information (or the receiver UE can obtain the neighboring cell time or frequency offset list through its own serving cell in advance). Similarly, the resource notification information sent by the eNB1 may include the serving cell/base station information of the sender UE.

In step 706, after receiving the resource scheduling information, the UE1 sends the resource notification information by broadcast through the air interface, the information includes the timing auxiliary information (for the asynchronous network deployment), which may include the serving cell/base station information of the UE1, so that the D2D receiver UE synchronizes with the UE1 by taking the synchronization signal of the serving cell/base station of the UE1 as a reference.

Thereafter, the UE1 may use the allocated resources to send the D2D data, the UE2 and the UE3 can obtain the receiving resources by monitoring the D2D communication resource pool or the resource notification information and receive the D2D data sent by the UE1.

The Sixth Embodiment

Figure 8:
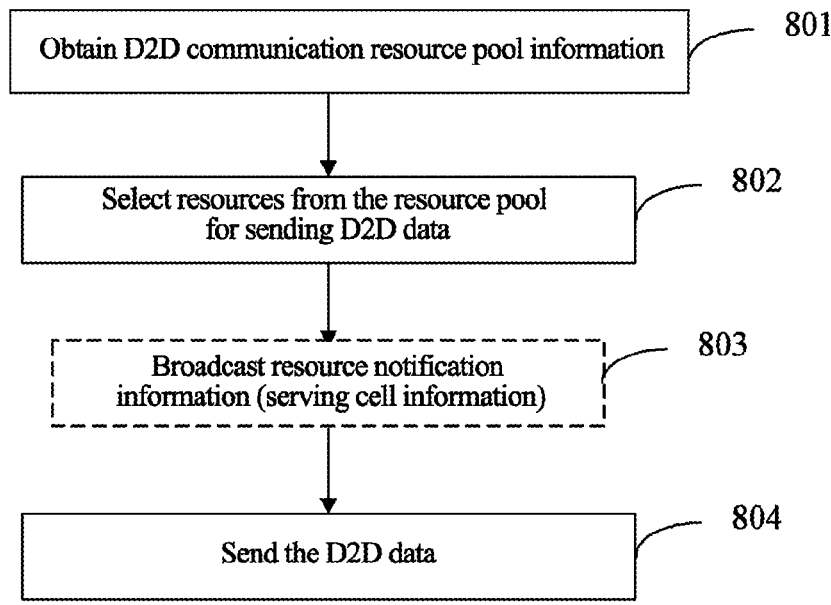
FIG. 8 is a schematic diagram of the process of a sixth embodiment of the present document.

The present embodiment describes the D2D communication method for D2D communication served by a plurality of base stations in the way of the resource competition. It should be noted that, the method in the embodiment of the present document is applicable not only to the D2D communication process, but also to the D2D discovery process. FIG. 8 is a flow chart of the present embodiment. Steps in the process of FIG. 8 are as follows:

In step 801, the D2D UE obtains the D2D communication resource pool information. The D2D UE obtains the D2D communication resource pool information by way of pre-configuration, or by receiving a broadcast message of the base station or the control node (no network coverage). If the information is obtained via the broadcast way of the base station or the control node, the base station or the control node obtains the D2D communication resource pool information configuration before the broadcast, and the configuration method can refer to the method described in the first, second and third embodiments.

In step 802, the D2D UE has D2D communication data to send, and selects resources from the obtained D2D communication resource pool for transmitting the D2D data. Optionally, before the UE selects the D2D data transmission resources, it may judge the D2D communication type and selects the corresponding resources according to the D2D communication type. Wherein the D2D communication type refers to whether the D2D communication is an inter-cell/base station D2D communication, e.g., whether the UEs participating in the D2D communication are served by the same cell/base station or different cells/base stations. If the UE judges that the D2D communication type is the intra-cell/base station D2D communication, it may select the D2D communication resources from the intra-cell/base station D2D communication resource pool for the UE1; if the UE judges that the D2D communication type is the cross-cell/base station D2D communication, it may select the D2D communication resources from the cross-cell/base station D2D communication resource pool for the UE1; for example, for the D2D unicast communication, since the target UE in the communication has been determined, the UE can judge the D2D communication type through the way for obtaining identification information of the serving cell/base station of the target UE. Specifically, the following ways can be used to obtain the serving cell/base station identification information of the target UE: a. through the D2D discovery signal, for example, by explicitly carrying it in the discovery signal, or implicitly indicating it through the discovery signal time-frequency resources; b. through the paging way initiated by the base station or the D2D UE; c. through the way for querying the D2D server.

In step 803, optionally, the UE selects the D2D data transmission resources and then sends the resource notification information via the air interface, the information includes the timing auxiliary information, which may include the serving cell/base station information of the UE1 so that the D2D receiver UE synchronizes with the UE1 by taking the synchronization signal of the serving cell/base station of the UE1 as a reference. Different from the fourth and fifth embodiments, this embodiment uses the resource competition way, and usually the UE will not inform the base station or the control node of the selected communication resource information after selecting the competition resources, therefore, it does not require the base stations or the control nodes interact or negotiate the resource scheduling information or send the resource notification information.

In step 804, the UE sends the D2D data in the selected D2D communication resources.

The Seventh Embodiment

The present embodiment provides a device-to-device discovery and communication system, comprising:
a control node and a D2D user equipment;
the control node is configured to obtain the D2D resource set information, wherein the D2D resource set includes a D2D discovery resource set and/or a D2D communication resource set, and determine the D2D discovery or communication scheduling resources of the D2D user equipment according to the D2D resource set information;
the D2D user equipment is configured to determine the D2D discovery or communication scheduling resource of the D2D UE according to the D2D resource set information, and use the D2D communication scheduling resources to perform the D2D discovery or the D2D communication;
Preferably, the control node is further configured to send the D2D resource set information to other control node or a core network element or a newly added D2D control network element.

Preferably, the system further includes other control node and/or the core network elements and/or newly added D2D control network element;
the other control node and/or the core network element and/or the newly added D2D control network element are configured to send recommended or available or unavailable D2D resource information to the control node;
the control node is further configured to adjust and determine its own D2D resource set information according to the recommended or available or unavailable D2D resource information.

Preferably, the control node is further configured to send the D2D resource set information to the neighboring control node.

Preferably, the control node is further configured to send the D2D resource set information by broadcast through the air interface.

Preferably, the control node is further configured to send the D2D discovery or communication resource scheduling information of the D2D user equipment to the relevant neighboring control node, wherein the relevant neighboring control node at least include one of the following:
a neighboring control node to which the target D2D UE in the D2D discovery or communication of the D2D UE accesses,
a neighboring control node to which the D2D UE in a D2D group in the D2D discovery or communication of the D2D UE accesses,
a neighboring control node of the control node.

Preferably, the relevant neighboring control node is configured to judge whether the D2D discovery or communication scheduling resource of the D2D user equipment is available or not, and send a response message to the control node.

Preferably, the control node is further configured to: determine whether to change the D2D discovery or communication resource scheduling information of the D2D user equipment according to the received response message.

Preferably, the control node is further configured to: after determining the D2D communication scheduling resource of the D2D UE according to D2D resource set information, send the D2D discovery or communication scheduling resource notification information through the air interface by way of broadcast or unicast, and the D2D discovery or communication scheduling resource notification information includes the D2D discovery or communication resource scheduling information.

The relevant neighboring control node or the D2D user equipment is further configured to: send the D2D discovery or communication scheduling resource notification information through the air interface by way of broadcast or unicast after receiving the D2D discovery or communication scheduling resource information.

Figure 9:
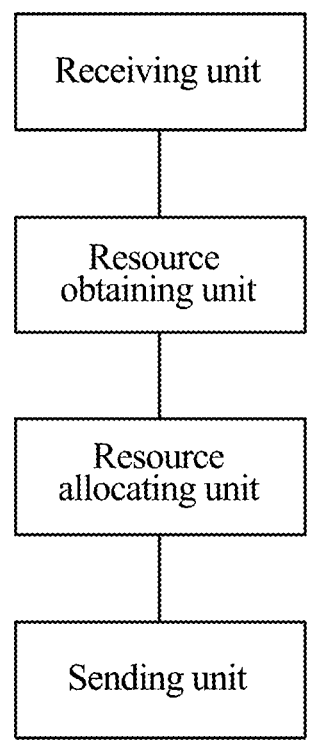
FIG. 9 is a block diagram of a control node in accordance with a seventh embodiment of the present document.

As shown in FIG. 9, the control node includes a resource obtaining unit and a resource allocating unit, wherein, the resource obtaining unit is configured to: obtain D2D resource set information, wherein the D2D resource set includes the D2D discovery resource set and/or D2D communication resource set;

the resource allocating unit is configured to: determine the D2D discovery or communication scheduling resource of the D2D user equipment according to the D2D resource set information.

Preferably, the control node further includes: a sending unit, configured to: send the D2D resource set information to other control nodes or core network element or newly added D2D control network element.

Preferably, the control node further includes: a receiving unit, which is configured to: receive recommended or available or unavailable D2D resource information sent by the other control node and/or the core network element and/or the newly added D2D control network element;

the resource obtaining unit is further configured to adjust and determine its own D2D resource set information according to the recommended or available or unavailable D2D resource information.

Preferably, the control node further includes:

a sending unit, which is configured to send the D2D resource set information to the neighboring control node.

Preferably, the control node further includes: a sending unit, configured to broadcast the D2D resource set information through the air interface.

Preferably, the control node further includes: a sending unit, configured to send the D2D discovery or communication resource scheduling information of the D2D user equipment to the relevant neighboring control node, wherein the relevant neighboring control node at least include one of the following:

a neighboring control node to which the target D2D UE in the D2D discovery or communication of the D2D UE accesses, a neighboring control nodes to which the D2D UE in a D2D group in the D2D discovery or communication of the D2D UE accesses, a neighboring control node of the control node.

Preferably, the control node further includes: a receiving unit, which is configured to: receive a response message sent by the relevant neighboring control node after judging whether the D2D discovery or communication scheduling resource of the D2D user equipment is available.

Preferably, the resource obtaining unit is further configured to determine whether to change the D2D discovery or communication resource scheduling information of the D2D UE according to the received response message.

Preferably, the sending unit is further configured to: after determining the D2D communication scheduling resource of the D2D UE according to the D2D resource set information, send the D2D discovery or communication scheduling resource notification information through the air interface by way of broadcast or unicast, wherein the D2D discovery or communication scheduling resource notification information includes the D2D discovery or communication resource scheduling information.

The embodiment of the present document further provides a computer program comprising program commands, when the program commands are executed by the control node, the control node can execute the abovementioned method.

The embodiment of the present document further provides a carrier carrying the abovementioned computer program.

In the embodiments of the present document, the control node obtains the D2D resource set information, wherein the D2D resource set includes a D2D discovery resource set and/or a D2D communication resource set, the control node or the D2D UE determines the D2D discovery or communication scheduling resource of the D2D UE according to the D2D resource set information, the D2D UE uses the D2D communication scheduling resource to perform the D2D discovery or the D2D communication. It can coordinate and interact the D2D discovery or communication resource information between different control nodes, and solve the problem of resource interaction, negotiation and synchronization between the UEs in scenarios that a plurality of D2D UEs participating in the D2D discovery or communication are served by different base stations. The technical solution provided in the embodiment of the present document solves the problem of the D2D discovery or communication resource interaction/negotiation as well as the synchronization between the D2D UEs in the case that a plurality of UE in the D2D discovery or communication are served by different base stations (or control nodes), and can coordinate and interact the D2D discovery or communication resource information between different control nodes, effectively reduce the interference between the D2D UEs between the base stations, and achieve the synchronization between the D2D UEs, so that the D2D discovery or communication served by the plurality of control nodes can be carried out smoothly.

Those ordinarily skilled in the art can understand that all or some of the steps of the abovementioned embodiments may be implemented using a computer program process, and the computer program may be stored in a computer-readable storage medium and executed on an appropriate hardware platform (such as a system, equipment, device, component, and so on), and during the execution, it includes one of the steps of the method embodiment or a combination thereof.

Alternatively, all or some of the steps of the abovementioned embodiments can also be implemented with integrated circuits, these steps may be made into individual integrated circuit modules respectively, or some of the modules or steps can be made into a single integrated circuit module to implement. Therefore, the present document is not limited to any specific combination of hardware and software.

Each device/functional module/functional unit in the abovementioned embodiments may be implemented with universal computing devices, they can be concentrated on a single computing device or distributed on a network composed of a plurality of computing devices.

When each device/functional module/functional unit in the abovementioned embodiments is implemented in the form of software functional module and sold or used as an individual product, they may be stored in a computer readable storage medium. The abovementioned computer-readable storage medium may be a read-only memory, magnetic or optical disk, and the like.

Anyone familiar with the technical field of the art within the scope of the present document discloses a technique can easily think of changes or replacements that shall fall within the protection scope disclosed in the present document. Therefore, the protection scope of the present document should be the protection scope of the claims.

INDUSTRIAL APPLICABILITY

The technical solution provided in the embodiment of the present document solves the problem of the D2D discovery or communication resource interaction/negotiation as well as the synchronization between the D2D UEs in the case that a plurality of UE in the D2D discovery or communication are served by different base stations (or control nodes), and can coordinate and interact the D2D discovery or communication resource information between different control nodes, effectively reduce the interference between the D2D UEs between the base stations, and achieve the synchronization between the D2D UEs, so that the D2D discovery or communication served by the plurality of control nodes can be carried out smoothly.

What is claimed is:

1. A device-to-device (D2D) discovery and communication resource allocation method, comprising:
   a control node obtaining D2D resource set information, wherein a D2D resource set comprises a D2D discovery resource set and/or a D2D communication resource set;
   the control node determining D2D discovery or communication scheduling resources of a D2D user equipment according to the D2D resource set information,
   wherein the control node comprises: a base station, or a D2D user equipment acting as a D2D control identity;
   the D2D resource set information comprises resource set information used for the D2D discovery or communication, and the resource set information comprises at least one of the following:
   a list of resources identified by carrier frequency and bandwidth information;
   a subframe pattern,
   resource block (RB) information,
   a resource usage constraint condition.

2. The method of claim 1, wherein, the control node obtaining D2D resource set information comprises:
   the control node obtaining the D2D resource set information from an operation, administration and maintenance (OAM) system;
   or, the control node itself configuring the D2D resource set information;
   or, the control node obtaining the D2D resource set information from a core network element or a newly added D2D control network element.

3. The method of claim 2, wherein, the control node itself configuring the D2D resource set information comprises:
   the control node configuring its own D2D resource set information according to D2D resource information used by a neighboring control node,
   wherein, the control node configuring its own D2D resource set information according to D2D resource information used by a neighboring control nods comprises:
   the control node obtaining the D2D resource information used by the neighboring control node through an S1 interface or an X2 interface or an air interface.

4. The method of claim 2, wherein, after the step of the control node itself configuring the D2D resource set information, the method further comprises:
   the control node sending the D2D resource set information to other control node or the core network element or the newly added D2D control network element.

5. The method of claim 4, wherein, after the step of the control node sending the D2D resource set information to other control node or the core network element or the newly added D2D control network element, the method further comprises:
   the control node receiving recommended or available or unavailable D2D resource information sent by the other control node or the core network element or the newly added D2D control network element;
   the control node adjusting and determining its own D2D resource set information according to the recommended or available or unavailable D2D resource information.

6. The method of claim 5,
   wherein, the resource usage constraint condition comprise that:
   a downlink cellular resource usage constraint condition is that downlink cellular resources can be only used in a non-cellular network coverage area;
   or, D2D dedicated resources can be applied to a network coverage area and a non-network coverage area.

7. The method of claim 6, wherein, the resource set information used for the D2D discovery or communication comprises at least one of the following:
   first D2D discovery or communication resource set information that can be used when all user equipments performing the D2D discovery or communication are served by the control node,
   second D2D discovery or communication resource set information that can be used when user equipments performing the D2D discovery or communication are served by the control node and the neighboring control node.

8. The method of claim 1, wherein, the method further comprises:
   the control node sending the D2D resource set information to the neighboring control node.

9. The method of claim 1, wherein, after the step of the control node obtaining the D2D resource set information, the method further comprises:
   the control node sending the D2D resource set information to the neighboring control node via the S1 interface or the X2 interface;
   or, the control node sending the D2D resource set information to the core network element or the newly added D2D control network element, wherein, after the step of the control node sending the D2D resource set information to the core network element or the newly added D2D control network element, the method further comprises:
after the D2D resource set information changes, sending changed D2D resource set information to the neighboring control node or the core network element or the newly added D2D control network element.

10. The method of claim 1, wherein, the method further comprises:
the control node sending the D2D resource set information by broadcast through an air interface,
wherein, the control node sending the D2D resource set information by broadcast through the air interface comprises:
the control node sending the D2D resource set information of the neighboring control node by broadcast through the air interface; or,
the control node sending the D2D resource set information that can be used under non-cellular network coverage by broadcast through the air interface.

11. The method of claim 1, wherein, the step of the control node determining the D2D discovery or communication scheduling resource of the D2D user equipment according to the D2D resource set information comprises:
the control node selecting the D2D discovery or communication scheduling resource of the D2D user equipment from the D2D resource set information,
wherein, the control node selecting the D2D discovery or communication scheduling resources of the D2D user equipment from the D2D resource set information comprises:
the control node judging whether all the D2D user equipments in the D2D discovery or communication of the D2D user equipment are served by the control node;
the control node selecting the D2D discovery or communication scheduling resources of the D2D user equipment from the D2D resource set information according to a judgment result.

12. The method of claim 11, wherein, the D2D resource set comprises a first D2D resource set and a second D2D resource set, and the control node selecting the D2D discovery or communication scheduling resources of the D2D user equipment from the D2D resource set information according to a judgment result comprises:
if the judgment result is yes, the control node selecting the D2D discovery or communication scheduling resources of the D2D user equipment from the first D2D resource set;
if the judgment result is no, the control node selecting the D2D discovery or communication scheduling resources of the D2D user equipment from the second D2D resource set.

13. The method of claim 1, wherein, after the step of the control node determining the D2D discovery or communication scheduling resources of the D2D user equipment according to the D2D resource set information, the method further comprises:
the control node sending the D2D discovery or communication resource scheduling information of the D2D user equipment to relevant neighboring control node, wherein the relevant neighboring control node at least comprise one of the following:
a neighboring control node to which a target D2D user equipment in D2D discovery or communication of the D2D user equipment accesses,
a neighboring control node to which a D2D user equipment in a D2D group in the D2D discovery or communication of the D2D user equipment accesses,
a neighboring control node of the control node.

14. The method of claim 13, wherein, the D2D discovery or communication resource scheduling information comprises: D2D resource allocation information and/or D2D resource configuration information,
wherein, the D2D resource allocation information at least comprises one of the following:
D2D time-frequency resource information,
transmission attribute information,
the transmission attribute information comprises modulation and coding scheme (MCS) information;
or
the D2D discovery or communication resource scheduling information further comprises indication information indicating resources used for sending or receiving data.

15. The method of claim 14, wherein, the D2D resource configuration information comprises D2D semi-persistent scheduling configuration information, wherein the D2D semi-persistent scheduling configuration information comprises at least one of the following:
a D2D semi-persistent scheduling air interface network temporary identifier, a D2D semi-persistent scheduling establishment/release indication, and a semi-persistent scheduling period,
wherein, the D2D resource configuration information further comprises:
a D2D broadcast/multicast/unicast communication identifier, or,
a D2D multicast communication group identifier, or,
a user equipment identifier of a D2D discovery or communication sender.

16. The method of claim 13, wherein, after the step of the control node sending the D2D discovery or communication resource scheduling information of the D2D user equipment to the relevant neighboring control node, the method further comprises:
after the relevant neighboring control node judges whether the D2D discovery or communication scheduling resources of the D2D user equipment are available, receiving a response message sent by the relevant neighboring control node,
if the D2D discovery or communication scheduling resources are available, the response message is an acknowledgement message; and/or,
if the D2D discovery or communication scheduling resources are not available, the response message is available or recommended D2D discovery or communication resource scheduling information.

17. The method of claim 16, wherein, after the step of the relevant neighboring control node sending the response message to the control node, the method further comprises:
the control node determining whether to change the D2D discovery or communication resource scheduling information of the D2D user equipment or not according to the received response message,
wherein, the control node determining whether to change the D2D discovery or communication resource scheduling information of the D2D user equipment or not according to the received response message comprises:
if the response message is the acknowledgment message, the control node not needing to change the D2D discovery or communication resource scheduling information of the D2D user equipment, and the control node sending the D2D discovery or communication resource scheduling information of the D2D user equipment to the D2D user equipment;

if the response message is not the acknowledgment message, the control node needing to change the D2D discovery or communication resource scheduling information of the D2D user equipment, and the control node sending changed D2D discovery or communication resource scheduling information to the D2D user equipment and/or the relevant neighboring control node.

18. The method of claim 17, wherein, the method further comprises:

after the control node determines the D2D communication scheduling resources of the D2D user equipment according to the D2D resource set information, or after the relevant neighboring control node or the D2D user equipment has received the D2D discovery or communication resource scheduling information, the control node or the relevant neighboring control node or the D2D user equipment sending the D2D discovery or communication scheduling resource notification information via the air interface by means of broadcast or unicast, wherein the D2D discovery or communication scheduling resource notification information comprises the D2D discovery or communication resource scheduling information.

19. The method of claim 18, wherein, the D2D discovery or communication scheduling resource notification information comprises timing auxiliary information, wherein the timing auxiliary information comprises:

time-domain and/or frequency-domain offset information, or, identification information of a control node to which the user equipment of the D2D communication sender accesses;

identification information of the control node comprises: identification information of a serving cell, or identification information of a serving base station, or identification information of the control node;

or the D2D discovery or communication scheduling resource notification information comprises indication information indicating resources used for sending or receiving data.

20. A non-transitory computer readable storage medium, comprising computer programs, wherein when the computer programs are executed by a control node, the control node can execute the method of claim 1.

21. A Device-to-Device (D2D) discovery and communication method, comprising:

a D2D user equipment obtaining D2D resource set information, wherein the D2D resource set comprises a D2D discovery resource set and/or a D2D communication resource set;

the D2D user equipment determining the D2D discovery or communication scheduling resources of the D2D user equipment according to the D2D resource set information;

the D2D user equipment using the D2D communication scheduling resources to perform D2D discovery or D2D communication;

the D2D resource set information comprises resource set information used for the D2D discovery or communication, and the resource set information comprises at least one of the following:

a list of resources identified by carrier frequency and bandwidth information;
a subframe pattern,
resource block (RB) information,
a resource usage constraint condition.

22. The method of claim 21, wherein, the D2D device obtaining the D2D resource set information from a broadcast message of a control node.

23. The method of claim 22, wherein, the step of the D2D user equipment determining D2D discovery or communication scheduling resources of the D2D user equipment according to the D2D resource set information comprises:

the D2D user equipment selecting the D2D discovery or communication scheduling resources of D2D user equipment from the D2D resource set information, wherein, the D2D user equipment selecting the D2D discovery or communication scheduling resources of the D2D user equipment from the D2D resource set information comprises:

the D2D user equipment judging whether all D2D user equipments in the D2D discovery or communication of the D2D user equipment are served by the control node;

the D2D user equipment selecting D2D discovery or communication scheduling resources of the D2D user equipment from the D2D resource set information according to a judgment result, the D2D resource set comprises a first D2D resource set and a second D2D resource set, and the control node selecting the D2D discovery or communication scheduling resources of the D2D user equipment from the D2D resource set information according to a judgment result comprises:

if the judgment result is yes, the D2D user equipment selecting the D2D discovery or communication scheduling resources of the D2D user equipment from the first D2D resource set information;

if the judgment result is no, the D2D user equipment selecting the D2D discovery or communication scheduling resources of the D2D user equipment from the second D2D resource set.

24. The method of claim 21, further comprising:

after determining the D2D discovery or communication scheduling resources, the D2D user equipment sending resource notification information by broadcast or unicast through an air interface.

25. A control node, comprising a resource obtaining unit and a resource allocating unit, wherein, the resource obtaining unit is configured to: obtain D2D resource set information, wherein the D2D resource set comprises a D2D discovery resource set and/or a D2D communication resource set;

the resource allocating unit is configured to: determine D2D discovery or communication scheduling resources of the D2D user equipment according to the D2D resource set information;

the D2D resource set information comprises resource set information used for the D2D discovery or communication, and the resource set information comprises at least one of the following:

a list of resources identified by carrier frequency and bandwidth information;
a subframe pattern,
resource block (RB) information,
a resource usage constraint condition.

26. The control node of claim 25, further comprising:

a sending unit, configured to: send the D2D resource set information to other control node or a core network element or a newly added D2D control network element, a receiving unit, configured to: receive recommended or available or unavailable D2D resource information sent by the other control node and/or the core network element and/or the newly added D2D control network element;

the obtaining unit further configured to adjust and determine its own D2D resource set information according to the recommended or available or unavailable D2D resource information.

27. The control node of claim 25, further comprising:

a sending unit, configured to send the D2D resource set information to a neighboring control node;

or a sending unit, configured to send the D2D resource set information by broadcast through the air interface.

28. The control node of claim 25, further comprising:

a sending unit, configured to send the D2D discovery or communication resource scheduling information of the D2D user equipment to a relevant neighboring control node, wherein the relevant neighboring control node at least comprise one of the following:

a neighboring control node to which a target D2D user equipment in D2D discovery or communication of the D2D user equipment accesses, a neighboring control node to which a D2D user equipment in a D2D group of the D2D discovery or communication of the D2D user equipment accesses, a neighboring control node of the control node.

29. The control node of claim 28, further comprising:

a receiving unit, configured to, after judging whether the D2D discovery or communication scheduling resources of the D2D user equipment are available, receive a response message sent by the relevant neighboring control node, the resource obtaining unit is further configured to determine whether to change the D2D discovery or communication resource scheduling information of the D2D user equipment according to the received response message, the sending unit is further configured to: after determining the D2D communication scheduling resources of the D2D user equipment according to the D2D resource set information, send the D2D discovery or communication scheduling resource notification information by broadcast or unicast through the air interface, wherein the D2D discovery or communication scheduling resource notification information comprises the D2D discovery or communication resource scheduling information.

* * * * *